Oct. 12, 1943.  P. M. LINCOLN  2,331,333
THERMAL DEMAND METER
Filed June 4, 1941  4 Sheets-Sheet 1

Inventor
Paul M. Lincoln
by
atty

Oct. 12, 1943.  P. M. LINCOLN  2,331,333
THERMAL DEMAND METER
Filed June 4, 1941  4 Sheets-Sheet 2

Inventor.
Paul M. Lincoln.

Oct. 12, 1943.    P. M. LINCOLN    2,331,333
THERMAL DEMAND METER
Filed June 4, 1941    4 Sheets-Sheet 3

Inventor.
Paul M. Lincoln.
by
HJS Dennison
atty.

Oct. 12, 1943.   P. M. LINCOLN   2,331,333
THERMAL DEMAND METER
Filed June 4, 1941   4 Sheets-Sheet 4

Inventor.
Paul M. Lincoln.

Patented Oct. 12, 1943

2,331,333

UNITED STATES PATENT OFFICE 2,331,333

THERMAL DEMAND METER

Paul M. Lincoln, Ithaca, N. Y.

Application June 4, 1941, Serial No. 396,496

6 Claims. (Cl. 171—34)

This invention relates to the thermal demand type of meter in which various time responses are achieved by the addition of different heat-absorbing masses and the principal object of the invention is to provide for more rapid meter response on short-time loads irrespective of the time period of the meter determined by the particular heat-absorbing mass applied thereto, thereby effecting considerable saving to the utility by permitting a more equitable billing of consumers on the basis of their power requirements, particularly on short-time loads.

A further and important object is to effect economy in the manufacture of meters of this class and to enable a more rapid calibration and standardization in meters of various time-response periods ranging from the fifteen-minute period meter or less to the sixty-minute period meter or more.

A further and important object is to enable short-time response on heavy short-time loads without at the same time incurring any possibility of over-registration under any condition or time of operation.

The principal feature of the invention resides in the novel manner of co-operatively associating a heat-absorbing mass with the heaters and heat-responsive means of the meter whereby the rate of interchange therebetween may be accurately predetermined to provide the required rapid meter response on application or change of load and in such a manner as to minimize shunting influence between the heater elements and the current-supplying leads, thereby permitting the adoption of a standard form of calibration for meters of various time periods.

Further and important features will be apparent in the following description.

In the drawings

Figure 1:
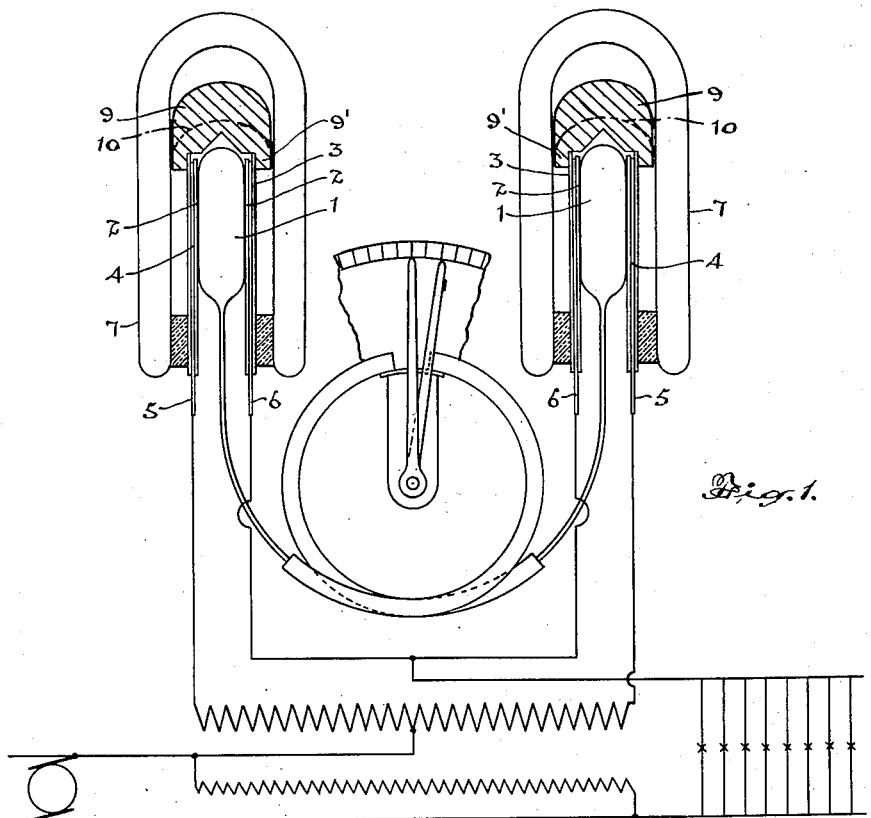
Figure 1 is a diagrammatic representation of a thermal electric meter embodying a preferred form of the present invention.

Thermal demand meters are well known for their accuracy and dependability in service and these are obtainable in many time periods ranging from less than fifteen minutes to over sixty minutes.

Thermal demand meters as at present constructed, while they fully meet the rigid requirement of the "Code for Electricity Meters" which fixes the time period for thermal watt meters as the "time required for the instrument to indicate 90% of the full value of a steady load which is thrown suddenly on it," nevertheless leaves something to be desired in regard to its response on heavy short-time loads, particularly when the meter is of the longer time period type, such as a thirty or sixty-minute meter, and it is an important feature of the present invention to render this type of meter extremely sensitive to short-time loads without at the same time incurring any possibility of over-registration and without in any way over-stepping the above-mentioned code requirement.

The present invention is applicable to and adapted to function in connection with thermal demand meters operating substantially on the principles set down, for instance in my prior Patents 1,940,759 and 1,992,535 (Reissue 20,172).

In the standard thermal demand meters the indication or response may be said to be the result of the following mathematical expressions:

For a maximum demand wattmeter $$\text{Indication} = \int_0^\infty w\epsilon^{-kt}dt \qquad (1)$$

For a maximum demand ammeter $$\text{Indication} = \int_0^\infty A^2\epsilon^{-kt}dt \qquad (2)$$

In the above expressions:

$w$=Instantaneous value of watts
$A$=Instantaneous value of amperes
$K$ and $K'$=Adjustable constants
$\epsilon$=Base of Naperian logarithms.

When we integrate mathematical Expressions 1 and 2 above, the results of these integrations are $$\text{Meter indication} = w(1-\epsilon^{-kt}) \qquad (3)$$

and $$\text{Meter indication} = A^2(1-\epsilon^{-k't}) \qquad (4)$$

There is a direct relationship between the length of the time period in a thermal wattmeter and the value of the constant $k$ in Expressions 1, 2, 3 and 4 above.

In view of the requirements set down in the above Code for Electricity Meters the value of $kt$ in Expressions 1, 2, 3 and 4 is fixed at 2.3026. This in turn fixes the value of $k$ at that obtained by dividing 2.3026 by 5, 10, 15, 30, 60 or whatever time period the utility may adopt for demand measurement. Therefore, for a 60 minute thermal wattmeter $k$=.03838; for a 30 minute, $k$=.07675; for a 15 minute, $k$=.1575; for a 10 minute, $k$=.23026 and for a 5 minute, $k$=.4605.

When a steady load is applied to a thermal wattmeter in accordance with the procedure specified in the "Code for Electricity Meters" and observations of the meter indications made at equal intervals of time, the function that is observed is $w(1-\epsilon^{-kt})$ as given in Expression 3 above. If, when the meter indication has reached a value of say $w'$ watts, the entire load is thrown off, observation of the wattmeter indication as it approaches zero, may be said to represent the function $w'\epsilon^{-kt}$. This is a pure exponential function and as such will plot as a perfectly straight line on semi-log paper. However, when the actual response curves of thermal wattmeters are plotted on semi-log paper, as they approach zero, they will indicate a response that departs very materially from a straight line as graphically depicted in Figures 9, 10 and 11.

This comes about because the heat that must necessarily enter or leave the working parts of the thermal wattmeter does not and cannot diffuse instantaneously throughout the mass of matter that is being heated or cooled during normal operation. It must be borne in mind that when an increase in load occurs, the hotter element of the thermal wattmeter becomes still hotter and the cooler element still cooler. With a decrease in load, the opposite effect occurs. At no load, the two elements are at the same temperature. The meter constantly registers the difference in temperature between the two elements. The rate of arriving at final temperature is dictated by the value of $k$. From Figures 8 and 9, as well as other figures, it will be noted that this rate of arriving at final is very much higher during the first ten or twenty minutes of load application than it is after the value of $k$ has arrived at its final value.

Figure 10:
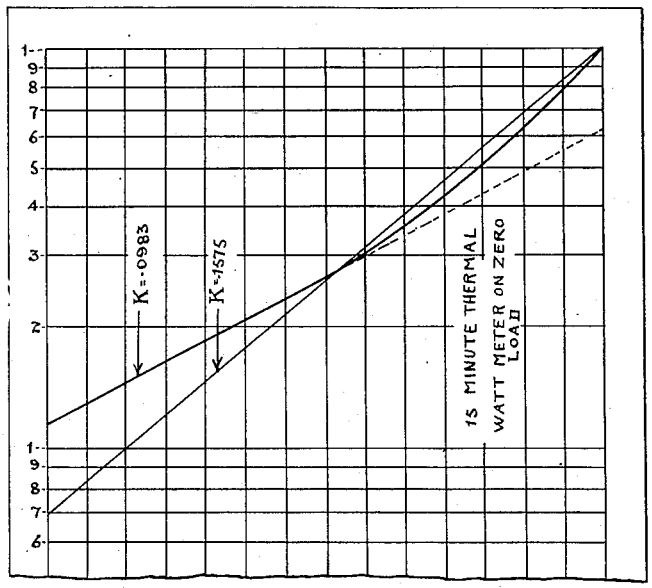
Figure 10 is a graph representation showing the response of the fifteen-minute thermal watt meter on zero load.
Figure 11:
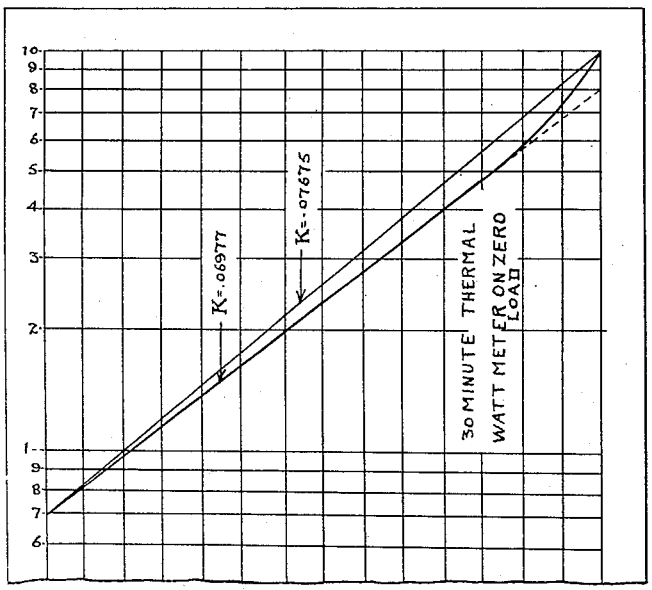
Figure 11 is a graph representation illustrating the response of the thirty-minute thermal watt meter on zero load.

In Figure 10 there is represented the off load response of a 15 minute thermal wattmeter as it approaches zero. In Figure 11 the off load response of a 30 minute thermal wattmeter is indicated on approaching zero.

Figure 4:
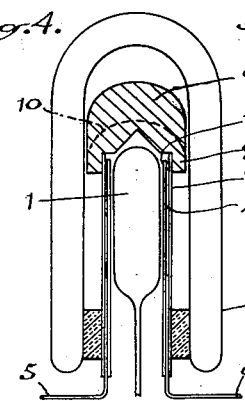
Figure 4 is a view similar to Figure 2 showing a sixty-minute mass applied thereto in accordance with a preferred form of the present invention and proportionately representing in broken lines a thirty-minute mass.
Figure 3:
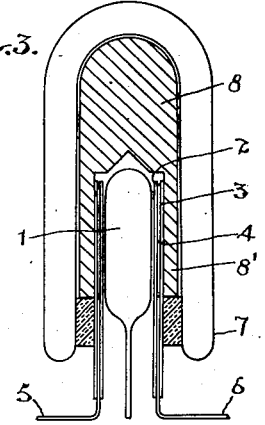
Figure 3 is a view similar to Figure 2 showing the application of a heat-absorbing body for approximately a sixty-minute time period delay.
Figure 9:
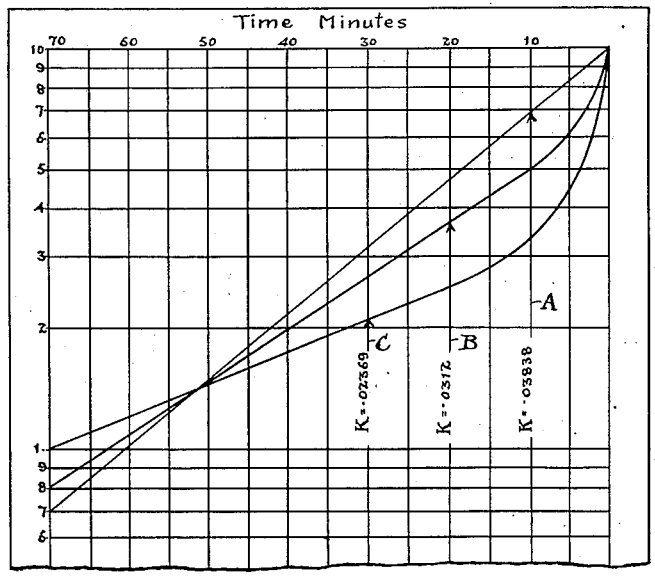
Figure 9 is a graph representation showing the response indication on zero load of two thermal electric meters having the masses differentially applied as represented in Figures 3 and 4.

It will be particularly noted that in connection with Figure 9 there are represented a straight line A representing the theoretical value $k$=.03838 for a 60 minute meter assuming instantaneous heat diffusion, and the curved line B resulting from a meter having masses applied as in Figure 3 (value $k$=.0312) and curve C representing the return to zero response of a thermal electric meter of a similar time period but having the heat-absorbing mass applied in accordance with the representation of Figure 4 (value $k$=.02369). Meters have been made and tested in accordance with the present invention, having a value of $k$ ranging from less than .02 to more than .14. Still further variations in the value of $k$ are readily obtainable, in accordance with the present invention, if desired. It must be remembered that the time for the thermal wattmeter to reach its final indication is dictated by this value of $k$.

Figure 8:
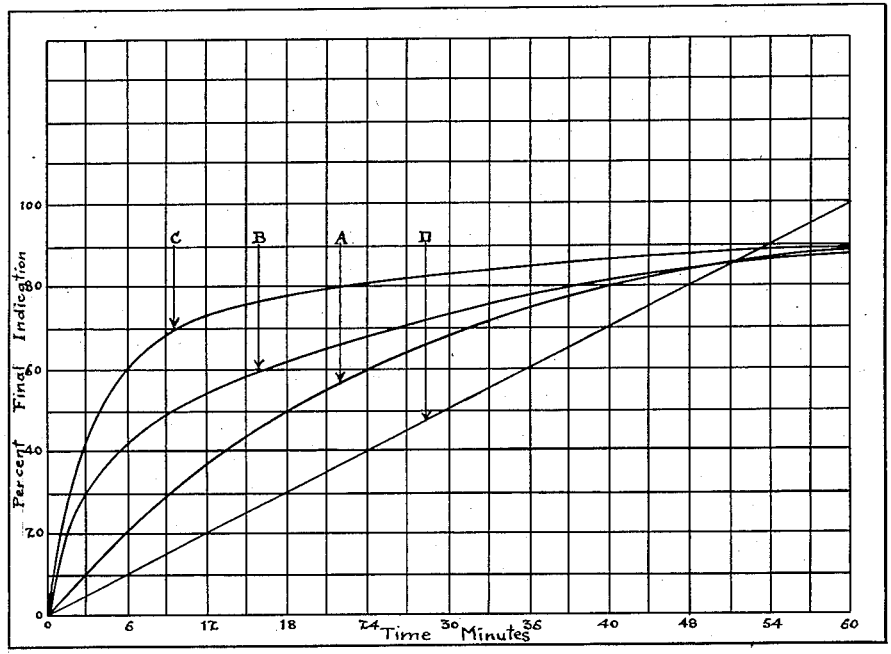
Figure 8 is a graph representation showing comparatively the responses of meters having time-limiting masses applied as represented in Figures 3 and 4 and also showing these in comparison with an accepted standard or "constant" and in relation to the response of a standard "block interval" meter of a corresponding time value.
Figure 12:
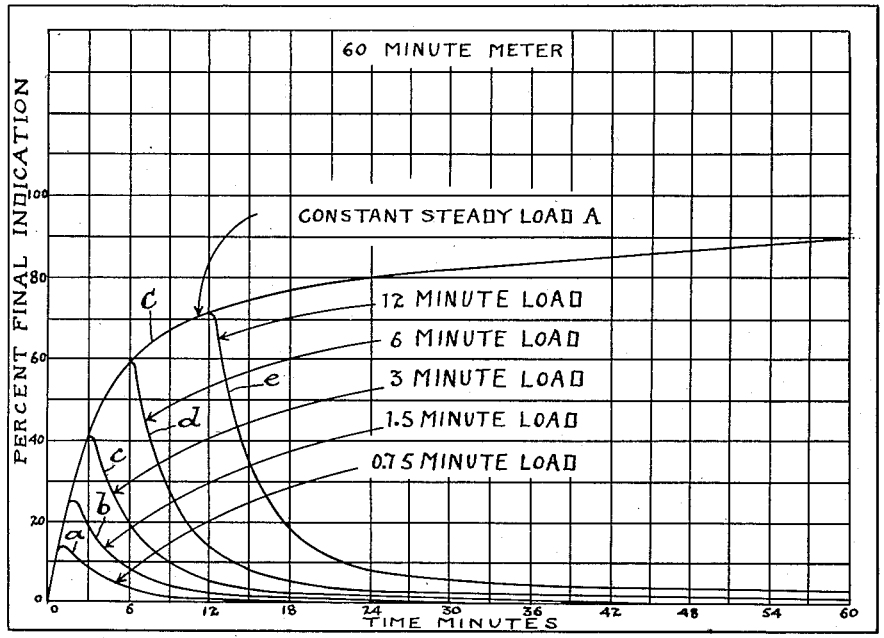
Figure 12 is a graph representation taken from actual tests showing the short-time response of a sixty-minute thermal meter embodying the present invention.

The difference in the curves B and C are directly due to the manner of applying the heat-absorbing masses and it is an important purpose of the present invention to so relate the heat-absorbing mass to the heaters and/or the heat-responsive reservoirs that the curve line C will compare with the curve line B substantially in the manner shown in Figures 8 and 9, or that meter indication will be substantially as shown by the line C, Figure 12.

The curves marked A in Figures 8 and 9 represent theoretical responses of the 60 minute thermal wattmeter assuming the diffusion of heat within the meter element to and from the heat-absorbing mass be instantaneous. These curves are a plot of the function $w(1-\epsilon^{-.03838t})$ and assume instantaneous heat diffusion. However, as is well known, heat does not and cannot be made to diffuse instantly throughout any mass of matter. As a result, the thermal wattmeter cannot be made to behave as is indicated by mathematical Expression 3. The actual value of the constant $k$ in the 60 minute wattmeter, as shown in Figure 9, is approximately 82% of the theoretical value in B of Figures 8 and 9 and approximately 62% of the value represented in C of Figures 8 and 9. This means that the rate of response of the thermal wattmeter after the first ten or twenty minutes of load application is much slower than the theoretical value given in mathematical Expression 3. During the first ten or twenty minutes of load application, the constant $k$ is far from being a constant. During the first ten or twenty minutes of load application the value of constant $k$ varies over a range of some ten or twelve to one, in the case of the thermal demand wattmeter response C in Figures 8 and 9. The value of this constant $k$ is determined by the slope of curves A, B and C in Figure 9. In the case of thermal demand wattmeter as represented by response curve B in Figure 9 there is a very considerable variation in the value of $k$, but the variation does not compare with that which takes place with the meter represented by the response curve C in Figure 9.

The straight line D in Figure 8 shows the rate of response of a standard "block-interval" demand wattmeter. The relative indications of all four of the demand wattmeters which in Figure 8, for various times of load durations, may readily be determined from the data in Figure 8 and the extremely rapid response on short time loads of thermal demand wattmeters constructed in accordance with the present invention is clearly depicted graphically in Figures 12 and 13.

Referring to Figure 12, the curve lines $a$, $b$, $c$, $d$ and $e$ represent the off load for returning to zero response of a 60 minute meter constructed in accordance with the present invention after a constantly applied steady load respectively of 0.75 minute, 1.5 minutes, 3 minutes, 6 minutes and 12 minutes.

Figure 13:
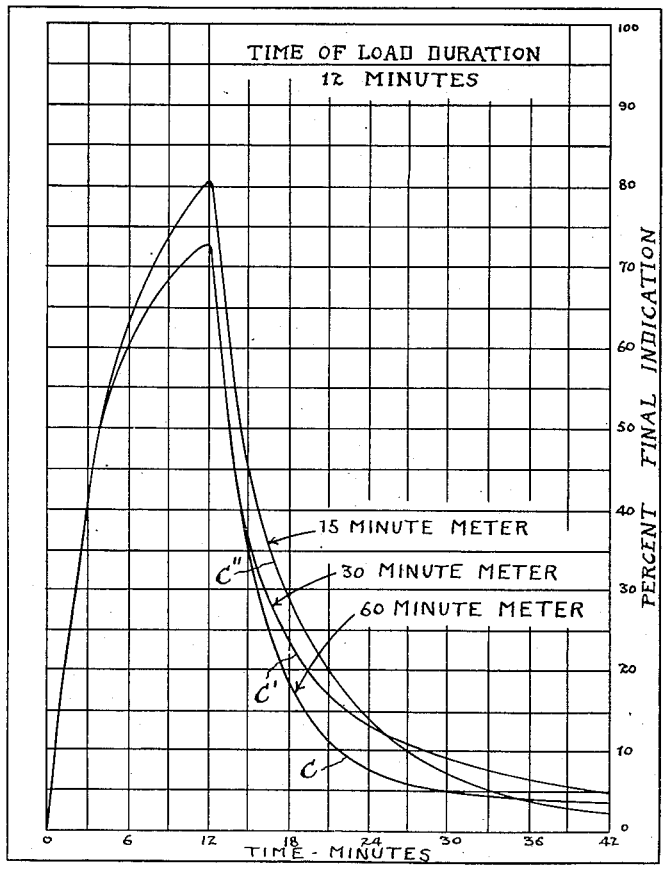
Figure 13 is an enlarged graph representation showing comparatively the respective responses of fifteen, thirty and sixty-minute meters constructed in accordance with the present invention under full load application suddenly released at the twelve-minute period.

In Figure 13 the lines C, C' and C'' represent the responses respective of a 60 minute, a 30 minute and a 15 minute thermal demand meter constructed in accordance with the present invention under an applied load of 12 minutes duration.

Figure 2:
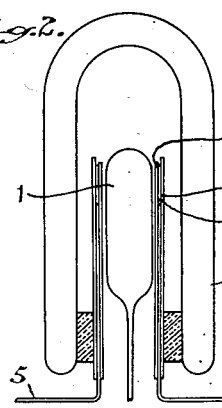
Figure 2 is an enlarged transverse section taken through one of the vacuum insulated energizing units of a fifteen-minute period thermal electric meter.

Referring to Figure 2, this represents one of the energizing units of a 15 minute thermal demand here shown comprising the usual Bourdon tube reservoir 1 surrounded by thin insulating tubes 2 and 3, between which are arranged the resistance heaters 4 having leads 5 and 6 connected therewith, the entire assembly being enclosed within an insulating vacuum bottle 7.

The co-operative relation between the assembled elements is such as to obtain a response under full load application substantially as represented by the line C'', Figure 13.

In Figures 3 and 4 the elements 1 to 7 are identical except for the application of the heat-absorbing masses 8 and 9.

It will be noted that in Figure 3 the mass 8 carries a skirt portion 8' which embraces the reservoir and heaters for substantially their full length so that heat diffusion between the reservoirs and heaters and the heat-absorbing mass is comparatively rapid, with the result that when a steady load is applied to the meter the response will be as represented by curve line B in Figure 8.

Referring now to Figure 4, it will be noted that the mass 9 has a skirt or lip portion 9' which is materially shorter than the skirt portion 8' of the mass 8, so that there is presented only a restricted path for heat transference or diffusion into and out of the mass 9, so that the meter response on and off load is substantially as represented by curve line C in Figures 8 and 9. Also, since the mass required to attain a given final temperature depends on the rate of heat diffusion, the total mass required in Figure 4 is much less than in Figure 3 for the same time rating.

It is quite apparent that by applying the mass as represented in Figure 4 distinct advantages are achieved in rapid meter response compared to a meter having the heat-absorbing mass applied in the manner illustrated in Figure 3.

It will be moreover apparent that considerable economy will be effected in manufacture due, not only to a reduction in the size of mass required for a given time period rating, but also to the fact that the long encircling sleeve is eliminated or substantially so, achieving greater simplicity and a material reduction in weight.

The mass 9 is herein representative of a 60 minute mass, and as represented in broken lines at 10, a 30 minute mass or other time mass is adapted to be applied in a similar manner to give the short-time response in a 30 minute meter as represented by the curve line C' in Figure 13. Thus it will be readily appreciated that the 15 minute meter unit as represented in Figure 2 may be loaded with any suitably sized mass so associated with the heater and/or reservoir as to obtain rapid-meter responses which are not possible where, as in Figure 3, the sleeve or skirt portion extends substantially the full length of the heater elements.

Figure 5:
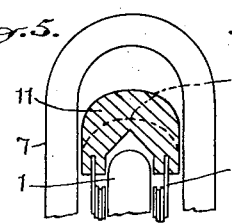
Figures 5, 6 and 7 are fragmentary sectional elevations representing various co-operative relations between the heat-absorbing mass and the heaters and/or the heat-responsive means.
Figure 6:
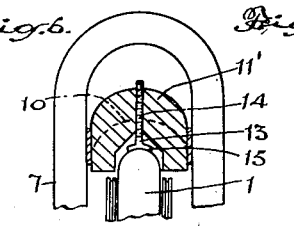
Figure 7:
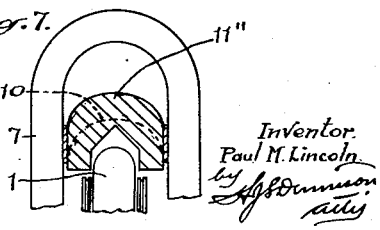

I have found that after careful experimentation these desirable rapid-response characteristics may be obtained by associating the required size mass in various manners with the heaters or reservoirs, and I have indicated in an exemplary manner in Figures 5, 6 and 7 various ways in which the metal heat-absorbing masses 11 may be applied.

In Figure 5 the mass is shown provided with a cylindrical skirt 12 which may be of comparatively thin gauge metal, forming a restricted path for heat flow and this is shown embracing the upper ends of the heaters and may be either formed integral with the mass 11 or as a separate insert of a metal of different heat conductivity. Or, the cylindrical skirt 12 may be of insulating material thereby making heat diffusion still slower.

In Figure 6 the mass 11' is shown spaced clear of embracing relation to the heaters and having a central pin 13 of suitable heat-conducting metal preferably adjustably threaded axially into the mass, as represented at 14, and having the lower end cupped to snugly embrace and preferably soldered or brazed to the upper end of the reservoir 1, as represented at 15.

In Figure 7 I have shown the mass 11'' as arranged above the heaters and reservoir and free of physical contact so that heat interchange is entirely by radiation and/or convection.

It will be apparent that with the modification shown in Figures 5, 6 and 7 the meter responses may be adjusted within a considerable range, more rapid response being obtained by the combination shown in Figure 5 over that shown in Figure 4 and proportionately faster rates of response being obtainable by the combinations shown in Figures 6 and 7 respectively.

By applying the heat-absorbing masses in the manner defined or exemplified in Figures 4 to 7 a further distinct advantage is had over that shown in Figure 3, since it is quite evident that the all-embracing sleeve 8' does a very considerable amount of thermal shunting. In other words, a considerable part of the heat produced in the heaters is transmitted rapidly to the extensive skirt portion 8' and, instead of going exclusively to the mass 8, it is conducted in great part to the copper leads 5 and 6 and thence through the copper leads to the other colder element of the meter.

In the constructions represented in Figures 4 to 7 there is no such thermal shunting of the heat and this provides a considerable advantage, since with the construction shown in Figure 3 the calibration of the meter must be made with the mass in place.

However, by applying the mass in the manner defined in accordance with the present invention it is simply necessary to first correctly calibrate a 15 minute meter without any mass in place, and the desired mass for a 30, 60 or other period of meter may then be applied and there will be no disturbance to this calibration since there will be no shunting from this source. This is an important point in simplifying and reducing the cost of manufacture, since the time required to calibrate a 15 minute meter is one half that of a 30 minute meter and one quarter that of 60 minute meter.

If after calibration of a 15 minute unit the mass is applied as represented in Figure 3 the calibration will no longer be correct since the thermal shunting which results will definitely disturb the calibration.

It will be readily appreciated that the present invention greatly enhances the capacity of thermal demand meters in regard to rapid response on short time loads, and it will be apparent that thermal demand meters embodying the principle of heat diffusion as set forth herein may be produced for any required time period providing distinct advantages over demand meters of various types as at present in use.

What I claim as my invention is:

1. In a thermal electric meter having heat responsive means and heaters parallelly arranged and influentially associated therewith, a heat absorbing mass of metal arranged at one end of said heat responsive means and fixedly spaced therefrom to compel a response under full load substantially corresponding to the full load response of a thermal electric meter of lesser time rating for at least the first three minutes of the full load application and while compelling said first-mentioned meter to arrive substantially at but not beyond the 90% indication with the full load applied for its full time rating.

2. In a thermal electric demand meter having heat responsive means including a reservoir and heaters influentially associated therewith and having electric supply leads extending from the lower end, of a heat-absorbing mass of metal disposed above and in close proximity to the upper end only of said heaters and reservoir essentially free of thermal shunt relation between said heaters and leads for determining the time response characteristic of said meter.

3. In a thermal electric demand meter having heat responsive means including a reservoir and heaters influentially associated therewith and having electric supply leads extending from the lower end, of a heat absorbing mass of metal provided with a shallow extending skirt portion supported above the upper ends only of the heater elements.

4. A thermal electric meter as claimed in claim 2 having the heat-absorbing mass formed with a depending skirt representing only a small fraction of the length of the mass.

5. A thermal electric meter as claimed in claim 3 in which the skirt portion of the mass is formed separate from the mass of a metal of predetermined heat conductivity.

6. A thermal electric meter as claimed in claim 2 in which the heat-absorbing mass is spaced from the heaters and reservoir is supported by a pin-like member of predetermined heat conducting capacity extending from the mass into intimate heat interchange engagement with the reservoir.

PAUL M. LINCOLN.